Dec. 11, 1962  J. K. DEW  3,067,577
METHOD AND CONTROL SYSTEM FOR SENSING TEMPERATURED
DIFFERENTIALS OF FLOWING GASES
Filed Jan. 25, 1960  4 Sheets-Sheet 1

INVENTOR.
JOSEPH K. DEW

BY *Thomas S. Macdonald*

ATTORNEY

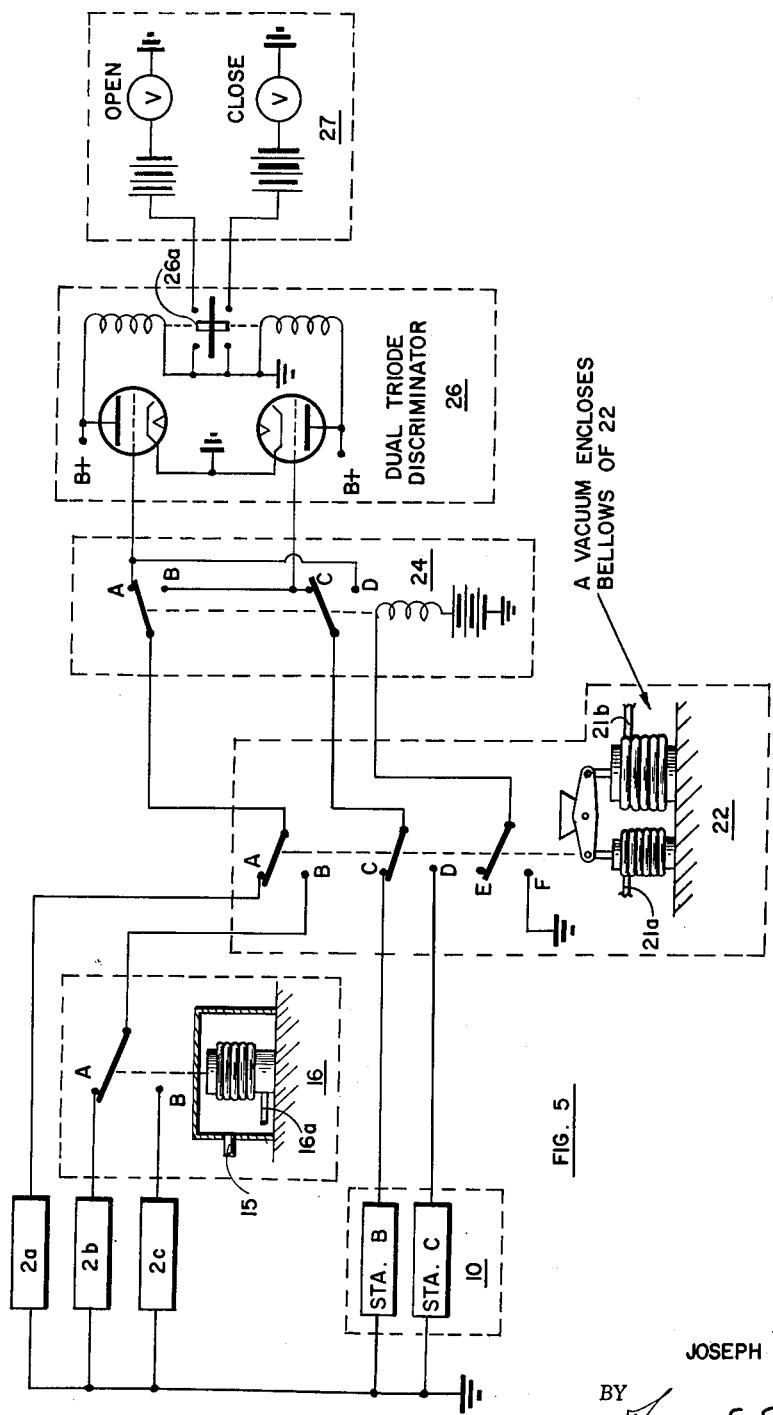

Dec. 11, 1962 J. K. DEW 3,067,577
METHOD AND CONTROL SYSTEM FOR SENSING TEMPERATURED
DIFFERENTIALS OF FLOWING GASES
Filed Jan. 25, 1960 4 Sheets-Sheet 3

INVENTOR.
JOSEPH K. DEW

BY *Thomas S. MacDonald*

ATTORNEY

Dec. 11, 1962 J. K. DEW 3,067,577
METHOD AND CONTROL SYSTEM FOR SENSING TEMPERATURED
DIFFERENTIALS OF FLOWING GASES
Filed Jan. 25, 1960 4 Sheets-Sheet 4

INVENTOR.
JOSEPH K. DEW
BY
*Thomas S. MacDonald*
ATTORNEY ated Dec. 11, 1962

3,067,577
METHOD AND CONTROL SYSTEM FOR SENSING TEMPERATURED DIFFERENTIALS OF FLOWING GASES
Joseph K. Dew, La Habra, Calif., assignor to North American Aviation, Inc.
Filed Jan. 25, 1960, Ser. No. 4,301
7 Claims. (Cl. 60—35.6)

This invention relates to a method and control system for sensing temperature differentials which in turn indicate the characteristics of flowing gases and more particularly to a method and control system which is capable of sensing the difference in absolute temperatures of gases in air breathing engines for aircraft and missiles which absolute temperatures indicate the correlated pressures and speed of the gas flow so as to provide for efficient control of engine thrust.

In the field of engine controls for aircraft and missile engines adapted to move relative to an aerodynamic environment, numerous successful control systems have been developed utilizing pressure differentials as a medium for control of signals utilized to operate a contra-parameter which in turn regulates the fuel and inlet characteristics within a prescribed tolerance for efficient thrust application. Pressure differential devices have the inherent disadvantage that the signal strength decreases with altitude such that the pressure device must be sensitive enough to operate at the highest flight altitude as well as be structurally capable of withstanding the higher pressure conditions at lower altitudes. Thus, a compromise in design for a specific aircraft usually results in loss of thrust efficiency at high altitudes, increased risk of system damage at low altitudes, and increased susceptibility to harmful interference from noise vibrations.

Many prior art engine control systems, such as the turbine engine control disclosed in the patent to Pearl et al., No. 2,796,733, have attempted to overcome the inherent inadequacies of pressure control systems by employing devices wherein the total temperature of flowing inlet gases is compared to the total temperature of combustion chamber exhaust gases. Such systems rely solely on the parameter of total temperature and further depend on the accurate addition or subtraction of heat between the total temperature measuring probes for their desired function.

It is well known that the ratio of the adiabatic wall temperature to the total temperature in a jet engine duct varies very similarly to the ratio of the wall static pressure to the total pressure. As herein applied, adiabatic should be understood to define a flow process in which substantially no heat transfer occurs across an imaginary boundary formed by a unit-mass flow of an aerodynamic stream, for example. The total temperature at any point in a steady-state aerodynamic stream flowing through a jet engine duct, for example, is the same and thus provides for an adiabatic condition therein. Due to the fact that the total temperatures occurring at all points in such a stream would be the same, it is obvious that very accurate pre-calculated theoretical analyses may be readily made, in contrast to analyses made relative to an unsteady-state aerodynamic stream.

In the hereinafter illustrated device employing a jet engine duct through which an adiabatic aerodynamic stream is adapted to flow, the adiabatic wall temperature should be understood to comprise the theoretical static temperature of the adiabatic aerodynamic stream plus the increase in temperature due to the friction created when said stream flows against any particular internal surface portion of the jet engine duct. Such surface portions are understood to be in an adiabatic condition since there is essentially no heat transfer thereat. Thus, it is apparent that the parameters of: (1) The total temperature of the adiabatic aerodynamic stream, and (2) the adiabatic wall temperature, may be readily utilized to provide a temperature differential which has theoretically known variations dependent on the states of the adiabatic aerodynamic stream. The present invention utilizes this phenomenon and further notes the fact that temperature fluctuations occurring below total temperature are present in an airstream having a constant total temperature therethrough and such temperature variations may be employed to produce a temperature differential which may in turn provide for an improved fuel control system. The use of such temperature differentials may be considered in the nature of a discovery of a new dimension in temperature control parameters.

The hereinafter described method and control system for sensing temperature differentials of flowing gases has many advantages over the prior art pressure sensing devices. At a specific flight Mach number the minimum temperature differential signal occurring in the stratosphere is constant and proportionally increases at the higher or lower altitudes. By use of the temperature pickups, which directly converts the signal energy to electrical energy, the required electrical amplification for control operation can be obtained without the usual dead-band and acceleration problems of the prior art pressure systems. The components of the temperature system can be made more rigid and hence reduce the risk of damage due to high pressure operational conditions. The temperature system, by being basically electrical in nature, permits more freedom in the location of the system components within the aircraft. The basic uniformity of the total temperature distribution throughout the near adiabatic section of the inlet ducting renders the temperature system less susceptible to the characteristics of the total pressure profile and subject only to the local Mach number, radiation, and characteristics of the boundary layer at the sensing elements station.

An object of this invention is to provide an accurate and dependable method for sensing temperature differentials of flowing gases.

A further object of this invention is to provide a novel control system utilizing the novel method concepts of sensing temperature differentials of flowing gases.

A still further object of this invention is to provide a novel temperature control system which will efficiently control the thrust of an engine which engine is capable of controlled subsonic and supersonic movement relative to an aerodynamic environment.

These and other objects of the invention will become apparent from the following description taken in connection with the accompanying drawings, in which:

FIG. 5 is a schematic flow circuit diagram disclosing one preferred embodiment of the temperature differential control system of this invention.

Figure 7:
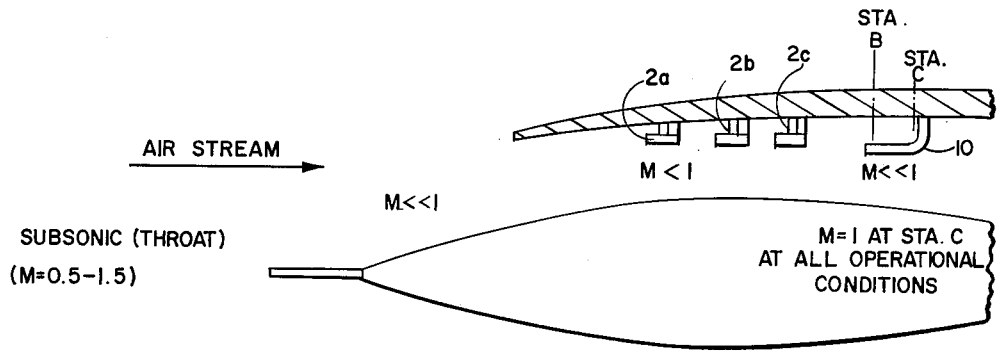
Figure 8:
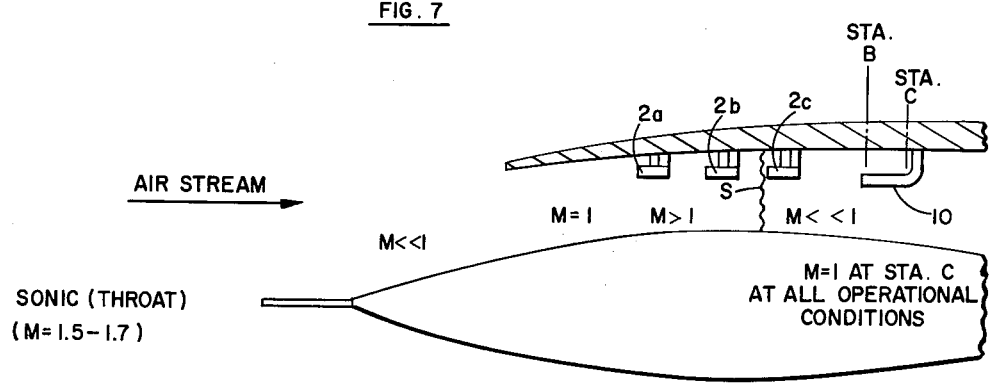
Figure 9:
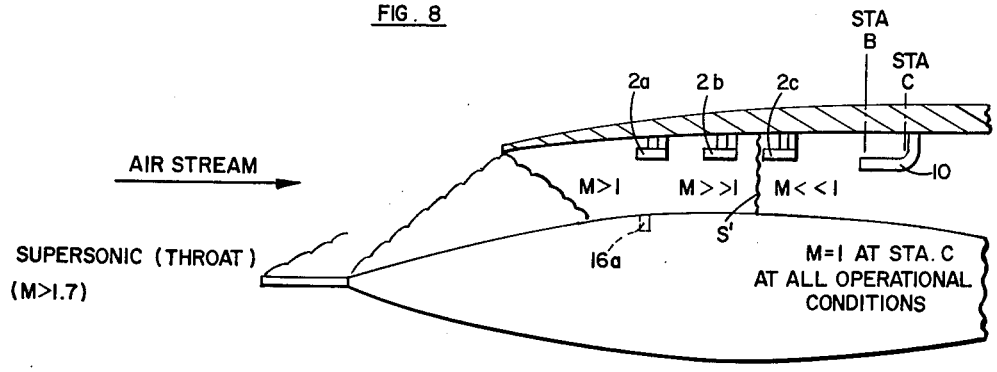

FIGS. 7, 8 and 9 disclose the relative Mach numbers as they would appear in the throat of the aircraft during three modes of operation.

Figure 10:
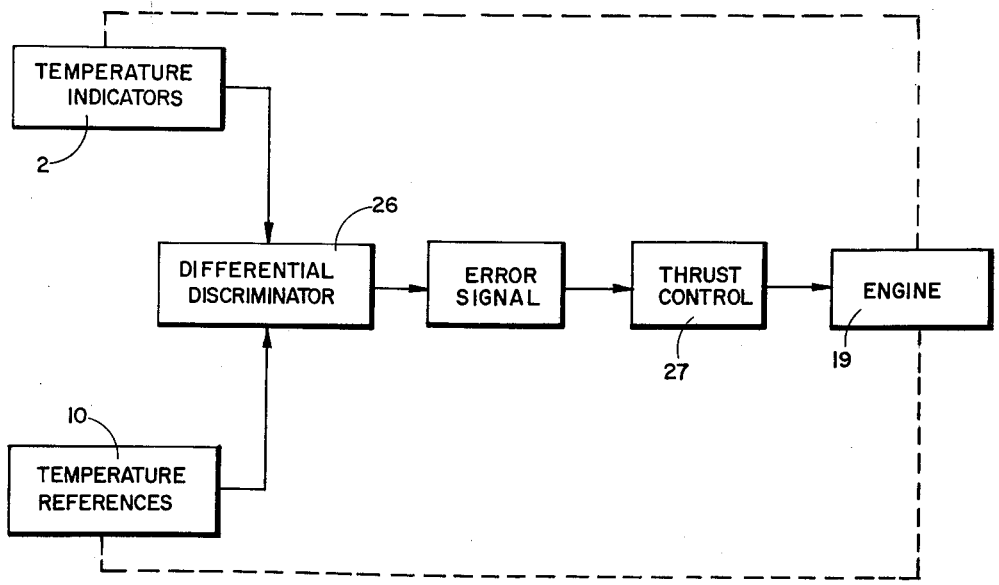

FIG. 10 is the basic diagrammatic flow diagram of the preferred temperature differential control system.

The prime purpose of this invention is to provide a method and system wherein a temperature differential control may be provided for an air breathing aircraft or missile which control is simple in operation and provides for very accurate control of various missile components. The herein disclosed temperature differential control system finds particular application for engine thrust controls. The hereinafter specifically described embodiment, constituting the preferred control system of this invention, comprises a series of temperature sensors located adjacent the inlet cowl of an air breathing engine and a selected number of stationary temperature references located in a predetermined sensing position adjacent and on the downstream side of the temperature sensors. A Mach meter (Raleigh pressures—free stream static and Pitot total pressures) is positioned on the fore-end of the aircraft and is operatively connected to a pressure switch which switch is directly connected to a transfer unit utilized to operatively connect a preselected temperature sensor to the corresponding temperature reference station at a predetermined relative speed. A corresponding temperature sensor and temperature reference are operatively connected to a differential discriminator and amplifier for one particular mode of operation, which discriminator will in turn, either increase or decrease the thrust of the engine depending on the quantity of voltage sensed. The voltage quantity is determined by the ratio of the temperature recorded at the temperature sensor to that recorded at the temperature reference.

Figure 1:
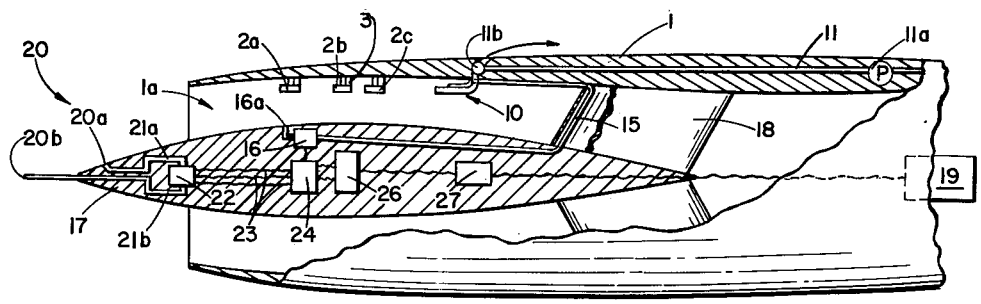
FIG. 1 is a showing of the preferred temperature differential control system embodiment as it would appear when used with an air breathing aircraft engine.

FIG. 1 discloses the structural positioning of the schematically illustrated preferred control system elements of FIG. 5 as employed in an engine adapted to operate in an aerodynamic environment. An outer shell 1 protects and houses the elements of the control system. An inlet duct or chamber 1a is formed between the shell 1 and innerbody 17 and is adapted to receive an aerodynamic environment therein. Three temperature sensors 2 are located on the inner surface of the shell 1 and are shown in detail in FIG. 2. The temperature sensors 2a, 2b and 2c are secured to the shell 1 and project into an upstream position of chamber 1a and function to indicate the temperatures thereat. An assembly support strut 3 is adapted to be securely attached to the inner shell and supports tubular shielding element 4. A thin shell needle probe 5 is supported on shell 4 by a probe support strut 6. In the preferred embodiment, the needle probe 5 may be constructed of copper or any other suitable highly conductive (heat) type material and is preferably evacuated.

Figure 2:
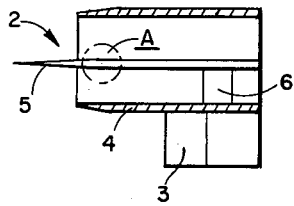
FIG. 2 is a detailed cross-sectional view of one of an adiabatic wall temperature indicators.
Figure 4:
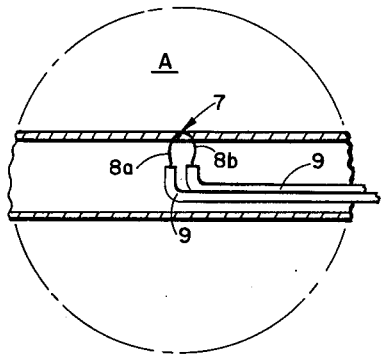
FIG. 4 is an enlarged view of area A of FIG. 3 and of FIG. 4.

The enlarged area A of FIG. 2 is shown in detail in FIG. 4 and discloses a thermocouple 7 comprising two dissimilar type thermocouple elements 8a and 8b joined to form a conventional type thermocouple junction. The thermocouple elements are insulated by electrical insulation 9, as shown. It is to be understood that other conventional type thermal pickup structures may be employed depending on the specific application thereof.

Figure 3:
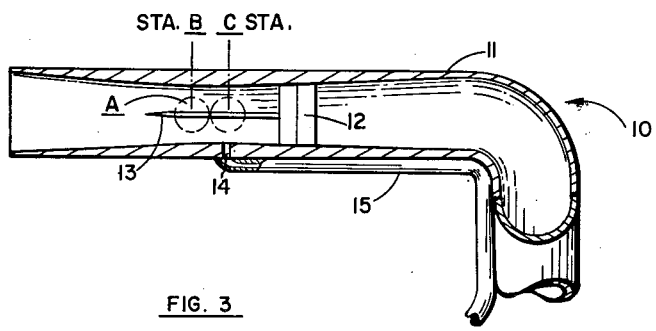
FIG. 3 is a detailed cross-sectional view of the adiabatic wall temperature reference.

A temperature reference 10 is located adjacent the temperature sensors and is secured to shell 1 and projects into an upstream portion of inlet chamber 1a. The temperature reference 10 is shown in detail in FIG. 3 as comprising a tubular shell 11 having a probe strut 12 secured therein supporting needle probe 13. Needle probe 13 is similar in construction to that of needle probe 5 of FIG. 2, but has two thermocouples therein identical to those shown in area A of FIG. 4. It should be noted that the temperature sensors 2a, 2b, and 2c, as well as the temperature reference 10, function to sense the temperature thereat. However, for clarification purposes they have been arbitrarily termed sensors and indicators, respectively.

The cross sectional area of tube 11, at station C, must be constructed sufficiently small to provide a Mach number of 1.0 at the throat at all operational conditions. The function of stations B and C are to be later described. A small orifice or opening 14 connects to a conduit 15 which conduit is operatively connected to a pressure switch 16.

An open end tube 16a is positioned adjacent the inlet chamber or cowl 1a so as to sense the pressure differentials thereat and relay such pressures to the pressure switch 16. In the hereinafter described preferred system of operation, the pressure differentials sensed between 14 and 16a are operative to selectively actuate switch 16 at relative speeds greater than Mach 1.7. A showing of a conventional type switch which may constitute switch 16 is disclosed in the patent to Harris, No. 2,656,428.

The tube 11 is connected to an auxiliary vacuum source 11a which may be selectively actuated so as to provide for sufficient supersonic flow at the probe strut during low relative speeds. The vacuum source 11a may take the form of a conventional type air pump or the like. A steam discharge valve 11b may be tapped into tube 11 to provide for predetermined aero stream discharges at supersonic speeds.

An inlet innerbody 17 is connected to the outer shell 1 by struts 18 which struts may be of the conventional type with the number thereof a matter of choice on the part of the maker. The struts should be of such a design so as to permit a sufficient flow of air to the engine 19, denoted schematically in FIG. 1. A Mach meter 20 is formed in the leading nose of the inlet innerbody 17 and comprises pressure ratio sensor tube 21a, which measures the static pressure at 20a and tube 21b, which measures the indicated or Pitot total pressure at 20b. The tubes are in turn operatively connected to a pressure switch 22, shown in FIG. 5 as comprising a double bellows type construction enclosed by a vacuum chamber.

Electrical circuitry 23 connects the pressure switch 22 to transfer unit 24 which is in turn adapted to selectively disconnect the circuits from the temperature sensors 2, and temperature reference 10 depending on the pressure differential sensed by Mach meter 20. The manner in which such a function is accomplished will be hereinafter described.

A differential discriminator 26 is adapted to relay an amplified signal to throttle control 27 so as to increase or decrease the thrust of engine 19. A detailed disclosure of a typical throttle control and engine operatively connected thereto, which combination may be readily employed herein is disclosed in the patent to Pearl et al., No. 2,796,733.

Specific application of the hereinbefore described temperature differential control, which constitutes a preferred embodiment of the invention, is dependent on the classification (subsonic, sonic, supersonic) of the flow Mach number at the throat of the inlet ducting to the engine at each flight Mach number. Therefore, as shown in FIG. 5, three temperature sensors 2 and one temperature reference 10, having two stations (B and C) are so coordinated so as to operatively connect the preselected temperature sensor with the correct corresponding temperature reference station at 10 for selective coupling thereof as the flight classification changes from one to another. Additional components such as tandem indicator probes to incorporate dead bands of operation, schedulers, engine starters, override controls, safety devices, destruction devices, indicator devices, specialized discriminators, and rate components may be added to the basic system for specific control applications.

The hereinafter described specific application of the temperature differential control system to an air breathing aircraft, capable of operating from subsonic to supersonic flight speeds, as hereinbefore stated, utilizes adiabatic wall temperature variations in the laminar boundary layer of the small sharp nose thin walled probes for the sensor and reference signals. The preferred control system embodiment as disclosed in FIG. 1 and FIG. 5 has a transferred engine control at the following numerical Mach numbers set forth in Table A:

TABLE A

| Specifications | Flight Mach number, $M_0$, range | | | |
|---|---|---|---|---|
| | 0.5 to 1.5 | 1.5 to 1.7 | 1.7 | 2.0 |
| Throat Mach Number | 0.90 | 1.00 | 1.27 | 1.56 |
| Mach. No. at Normal Shock | | 1.17 | 1.33 | 1.596 |
| Throat Classification | Subsonic | Sonic | Supersonic | |
| Indicator Probe Location | Sta. #1 | Sta. #2 | Sta. #3 | |
| Reference Probe Location | Sta. A | Sta. B | | |

System of Operation

FIG. 10 is a schematic showing of the novel broad concepts of the method of control of this invention as employed in the following described system of operation. The temperature sensors 2 and temperature reference 10 are diagrammatically shown as being adapted to relay their respective sensed temperature signals to differential discriminator 26, which in turn relays an error signal to the thrust control 27. The engine 19 is operatively connected to thrust control 27 and is adapted to increase or decrease in thrust depending on the polarity of the error signal sensed by the thrust control.

FLIGHT MACH NUMBER 0–1.5 (THROAT CLASSIFICATION: SUBSONIC)

The temperature control system for flowing gases, as shown in the preferred embodiment of FIG. 5, has three modes of operation. The first of these modes is in the flight regime 0.5 to 1.5 Mach number, wherein the operative circuit will be that of FIG. 5. The relative Mach values occurring in the inlet chamber 1a at this mode of operation are illustrated in FIG. 7 as appearing greater in the region of temperature sensor 2a than those occurring at the inlet and at the temperature reference 10. As was previously stated, the cross-sectional area of tube 11 at station C, is constructed sufficiently small to provide a Mach number of 1.0 at the throat of all operational conditions. The vacuum pump 11a aids this desired function at low relative speeds.

Since the adiabatic temperature ratio varies similarly to the static wall pressure ratio therein and the pressure ratio varies with the Mach number, it accordingly follows that the temperature ratio may be said to be essentially dependent on the Mach number as it occurs in chamber 1a and the tube 11.

When the adiabatic wall temperature at temperature sensor 2a is greater than the adiabatic wall temperature at station B, a positive voltage is sensed by differential discriminator 26, which is operatively connected to the temperature indicator 2a and temperature reference station B. The differential discriminator 26 in turn directs an amplified signal to thrust control 27 for decreasing the thrust in the combustion chamber of engine 19. If the adiabatic wall temperature at 2a equals that at station B, no voltage is impressed on 26 and no subsequent action results, since the fuel flow is sufficient. Should the temperature at 2a be less than the adiabatic wall temperature at station B, a negative voltage is sensed by discriminator 26, which in turn directs an amplified signal to control 27 for decreasing the thrust of engine 19.

In this flight regime the input signal is generated from station 2a and the reference signal from reference station B. As shown in FIG. 5 these two signals proceed to switches 22a and 22c respectively, and flow through switch 24a and 24c respectively, to the two grids of the dual diode discriminator 26. When the grid voltage of the upper discriminator is greater than the grid voltage of the lower discriminator, the plate voltage of the upper discriminator is less than the plate voltage of the lower discriminator, hence the bucking solenoids of discriminator 26 results in a downward movement of the plunger 26a into operative connection with the thrust control 27 which may be in the form of a fuel valve, for example. This condition results from the fact that too great a supply of fuel had originally been supplied to the engine.

The first mode of operation will work conversely in the event that too little fuel has been supplied, that is, reference B will give a higher signal than sensor 2a and the net result will be an opening of the thrust control 27 so as to increase fuel flow to engine 19.

FLIGHT MACH NUMBER 1.5–1.7 (THROAT CLASSIFICATION: SONIC)

When a flight Mach number slightly in excess of 1.5 is reached, the pressure ratio sensed at 20a–20b of Mach meter 20 is operative to close the contacts in pressure switch 22. Switch 22 in turn causes transfer unit 24 to disconnect the circuits from temperature sensor 2a and station B of the temperature reference and connect temperature sensor 2b and station C of the temperature reference respectively to the differential discriminator 26. The system is now a shock positioner type control for a choked inlet configuration. A like engine response to the Mach number 0–1.5 system will be obtained since a positive differential between the adiabatic wall temperature at temperature sensor 2b and station C will be operative to decrease the thrust of engine 19. When the temperature at sensor 2b is equal to that at station C a zero voltage is maintained and consequently no engine response occurs. A negative differential between the two will result in a negative voltage providing for increased thrust control of the engine 19.

In this mode of operation, pressure ratio switch 22 closes and transfers the circuits from 22a, 22c, and 22e to 22b, 22d and 22f respectively. It is to be noted that when the circuit is connected to 22f, the solenoid in transfer unit 24 is activated to reverse the signals and reference flow through to the discriminator by means of disconnecting contacts 24a and 24c and connecting contacts 24b and 24d.

The conditions of operation present when the vehicle is moving in this mode of operation result from the fact that the inlet throat is so designed so as to provide a choked supersonic flow behind this throat, thus creating a normal shock indicator S in the vicinity of temperature sensor 2b, as shown in FIG. 8. The disclosed preferred embodiment is so designed that when the shock S is ahead of sensor 2b (toward the inlet cowl) the control system provides for an increased fuel flow to the engine 19 and when the shock S occurs on the engine side of sensor 2b a decrease in engine thrust is realized. The temperatures on either side of shock S are different and consequently constitute effective parameters operative to change the temperature ratio. When shock S is positioned directly at sensor 2b an equilibrium or no thrust condition exists.

Following through this circuit, a stronger signal generated at sensor 2b proceeds through 22b, 24b, through 24c and proceeds to the lower part of the discriminator 26. Since this signal is greater than the reference signal from station C, the opposing solenoids of discriminator 26 move the switch towards and in contact with the upper contacts (FIG. 5) to thus open the fuel valve. The converse is also true, since when the normal shock is behind the probe at sensor 2b, the signal will be less positive than the reference C and the discriminator will then open throttle control 27 to release fuel. The subsequent fuel combustion acts to simultaneously create a back pressure operative to move the normal shock forward of the sensor 2b, which shock will eventually seek and maintain that position in the inlet cowl 1a which is indicative of that temperature parameter which is compatible with the temperature sensed at station C. This can be considered an equilibrium or constant thrust condition and in the preferred embodiment such an equilibrium positioning of the shock S occurs at sensor 2b (FIG. 8).

FLIGHT MACH NUMBER 1.7 OR GREATER (THROAT CLASSIFICATION: SUPERSONIC)

During a flight Mach number which is sufficiently high for the inlet throat flow to become supersonic, the static pressure at sensing tube 16a will decrease. The inlet passage 1a as well as the specific construction and relative positioning of temperature references 10 must be such as to provide for the static pressure differential between sensing tube 16a and the pressure at opening 14 to be abruptly reduced when the flight Mach number exceeds 1.7 (inlet throat becomes supersonic). Such a differential pressure will actuate pressure switch 16 and further functions to transfer the temperature sensor circuitry to indicator 2c. The system is now a shock positioner type control for a supersonic throat inlet as shown in FIG. 9. A like engine response to the Mach number 0–1.5 system will be obtained since a positive differential temperature at station 2c with respect to the temperature at station C will provide a positive voltage; when the temperature at station 3 with respect to station C remains neutral, the system will maintain a zero voltage condition (the shock S' of FIG. 9 at sensor 2c); and a negative differential between stations 2C and station C provides for a negative voltage.

Referring more specifically to FIG. 5, as the vehicle increases in Mach number at this mode of operation, a change of flow regime causes the throat of the inlet to become supersonic. At this point the pressure switch 16 is actuated so as to transfer the circuitry from 16a to 16b. Sensor 2b is disconnected and the switch is operative to connect sensor 2c to station C.

By definition the temperature recovery factor, $r$, at the surface of a body which is a boundary to an adiabatic laminary stream flow at Mach number, M is:

$$r = \frac{T_{wa} - T}{T_a - T}$$

or $$\frac{T_{wa}}{T_a} = r + \frac{T}{T_a}(1-r)$$

where $T_{wa}$ = adiabatic wall temperature, abs.
$T_a$ = stream total temperatures, abs.
$T$ = stream static temperature, abs.

For a laminar boundary layer condition at a temperature pickup point, $r$ is approximately constant at a value of 0.85 for air at a ratio of specific heats of 1.4. From adiabatic perfect gas relations:

$$\frac{T}{T_a} = 1 + \frac{-1}{2}M^2 - 1 = \frac{1}{1 = 0.2M^2}$$

By substituting Equation 3 in Equation 2, the adiabatic wall-to-total temperature ratio becomes:

$$\frac{T_{wa}}{T_a} = 0.85 + \frac{0.15}{1 + 0.2M^2}$$

Figure 6:
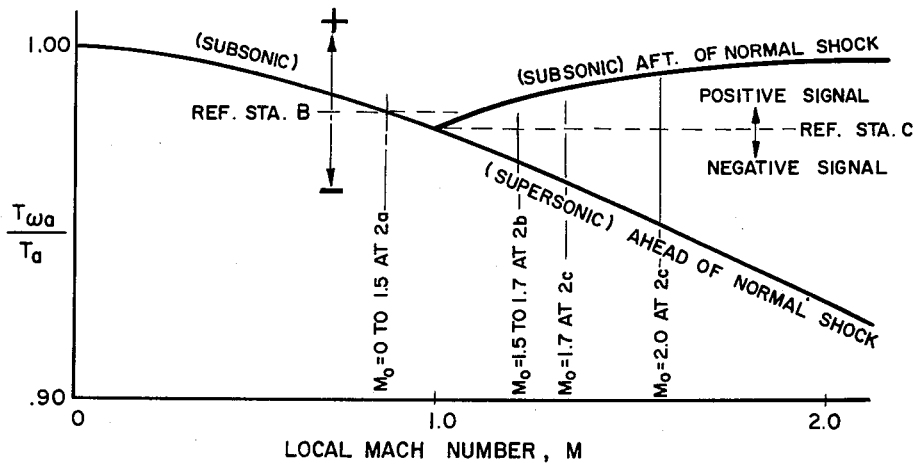
FIG. 6 is a graphical plotting of the adiabatic wall temperature (laminar boundary layer), total temperature ratio versus Mach number.

This ratio is essentially a function of Mach number only. The numerical variation is shown in FIG. 6 wherein the temperature ratio differentials are plotted against the local Mach number. The estimated lowest flight total temperature is 410° Rankin ($M_0 = 0.5$ in stratosphere). The maximum total temperature is 760° Rankin ($M_0 = 2.0$ in stratosphere). It is to be further understood that all transfers referred to during increasing flight Mach number will reverse for decreasing Mach number flight.

From the hereinbefore described unique method of utilizing the temperature fluctuations of a flowing aerodynamic environment in one specifically illustrated engine thrust control system, it will be appreciated that such a method could readily be practiced in other applications where the controlling or measuring of the rate of flow of gases is a necessary function.

Although the invention has been described and illustrated in detail, it is to be understood that the same is by way of illustration and example only and is not to be taken by way of limitation, the spirit and scope of this invention being limited only by the terms of the appended claims.

I claim:

1. A vehicle adapted to fly through an aerodynamic environment in combination with a temperature differential control system therefor, said vehicle comprising a shell member; an inlet interbody means positioned within said shell member so as to form a chamber means between said shell member and said inner body having an upstream portion and a downstream portion; a first temperature sensor secured to said outer shell and projecting into said upstream portion of said chamber means; a second temperature sensor secured to said outer shell adjacent said first sensor and projecting into said upstream portion of said chamber means; a third temperature sensor secured to said outer shell adjacent said second temperature sensor and projecting into said upstream portion of said chamber means; temperature reference means secured to said outer shell and projecting into said downstream portion of said chamber means, said temperature reference means comprising a first and a second temperature reference station; said first, second and third temperature sensors and said first and second temperature reference stations operatively associated with a differential discriminator means for operatively connecting the desired predetermined temperature sensor with the desired predetermined corresponding temperature reference station for sensing the temperature differentials occurring therebetween and for generating an error signal.

2. The invention of claim 1 wherein said chamber means is so constructed and arranged so as to compress said aerodynamic environment and create a shock substantially adjacent said second temperature sensor during a flight Mach range of Mach numbers 1.5–1.7; and further constructed and arranged to present a shock adjacent said third temperature sensor when the Mach number is greater than Mach number 1.7.

3. The invention of claim 1 further comprising throttle means operatively connected to said differential discriminator means, engine means operatively connected to said throttle means for having the thrust thereof varied dependent on said error signal received from said differential discriminator means.

4. A temperature differential control system comprising: a first, second and third temperature sensor adapted to be positioned adjacent to an inlet chamber of a craft which is adapted to move relative to an aerodynamic environment; temperature reference means positioned adjacent to said third temperature sensor in the inlet chamber of said craft; control system means operatively connecting said first, second and third temperature sensors and said temperature reference means; said temperature reference means comprising a first and a second temperature sensing station; said control system means operative to connect said first temperature sensor with said first temperature sensing station of said temperature reference means during a first flight regime of said craft; said control system means operative to connect said second temperature sensor with said second temperature sensing station of said temperature reference means during a second flight regime of said craft; said control system means operative to connect said third temperature sensor with said second temperature sensing station of said temperature reference means during a third flight regime of said craft, said control system means operative to sense the temperature differential between said selected temperature sensor and selected temperature reference station for creating an error signal therefrom.

5. The invention of claim 4 further comprising: a thrust control means operatively connected to said control system means; engine means operatively connected to said thrust control means, said engine means capable of an increase or decrease in the thrust thereof dependent on the temperature differential sensed by said control system means an error signal created therefrom.

6. A vehicle adapted to pass through an aerodynamic environment at supersonic speeds, having a chamber means terminating in an inlet at a first end thereof adapted to introduce an aerodynamic environment to an engine of said vehicle, said engine located at a second end of said chamber means; a first temperature sensing means secured to said vehicle and positioned adjacent the inlet of said chamber means adapted to indicate the adiabatic wall temperature thereat during a first flight regime; second temperature sensing means secured to said vehicle positioned adjacent said first sensing means and adapted to sense the adiabatic wall temperature of said chamber means during a second flight regime; third temperature sensing means secured to said vehicle and positioned adjacent said second temperature sensing means adapted to sense the adiabatic wall temperature of said chamber means during a third flight regime; temperature reference means secured to said vehicle and positioned adjacent said third temperature sensing means adapted to sense the adiabatic wall temperature of the aerodynamic environment in said chamber means during flight of said vehicle; control system means operatively connected to said first, second and third temperature sensing means and further operatively connected to said temperature reference means and operative to connect a preselected temperature sensor with said temperature reference means to sense temperature differentials therebetween during a predetermined first, second or third flight regime.

7. The invention of claim 6 further comprising: throttle means operatively connected to said control system means; and said engine means, said engine means adapted to increase or decrease in thrust depending on the temperature differential sensed by said control system means.

References Cited in the file of this patent

UNITED STATES PATENTS

| | | |
|---|---|---|
| 2,038,511 | Kortlandt | Apr. 21, 1936 |
| 2,638,992 | Lundquist | May 19, 1953 |
| 2,829,490 | Kresse | Apr. 8, 1958 |
| 2,870,601 | Demetriades | Jan. 27, 1959 |
| 2,895,692 | Leduc | July 21, 1959 |
| 2,914,911 | Richter | Dec. 1, 1959 |
| 2,954,667 | Laurent | Oct. 4, 1960 |

FOREIGN PATENTS

| | | |
|---|---|---|
| 805,510 | France | Aug. 22, 1936 |
| 320,812 | Germany | May 1, 1920 |
| 822,645 | Great Britain | Oct. 28, 1959 |

OTHER REFERENCES

Gas tables by Keenan and Kaye, Table 48, page 166 and Table No. 30, pages 139–142; copyright 1948, published by John Wiley and Sons, Inc., New York.